K. P. KIDDER.
Bee Hive.
No. 19,931.
Patented April 13, 1858.
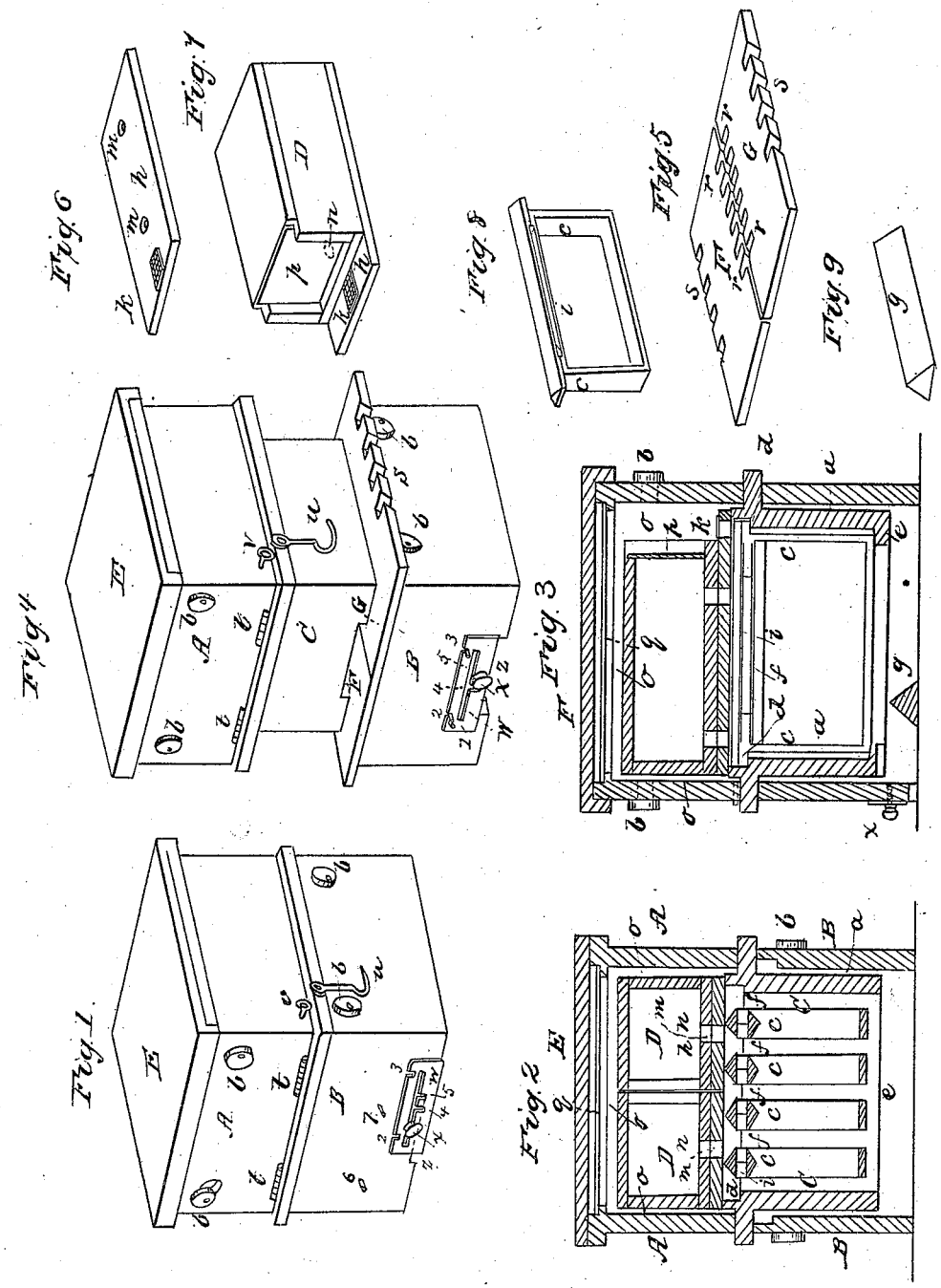

UNITED STATES PATENT OFFICE.

K. P. KIDDER, OF BURLINGTON, VERMONT.

BEEHIVE.

Specification of Letters Patent No. 19,931, dated April 13, 1858.

*To all whom it may concern:*

Be it known that I, KIMBALL P. KIDDER, of Burlington, in the county of Chittenden and State of Vermont, have invented certain new and useful Improvements in Beehives; and I do hereby declare the following to be a full, clear, and exact description of the construction and operation of the same, reference being had to the accompanying drawings, making a part of this specification, in which—

Figure 1 represents a perspective view of the hive in one of its forms. Figs. 2 and 3 represent vertical sections through the hive when in the position shown in Fig. 1, said sections being taken at right angles to each other. Fig. 4 represents in perspective the appearance of the hive in its other form—that is, when changed from a single to a double hive. Figs. 5, 6, 7, 8, 9 represent detached portions of the hive, and will be specially referred to hereafter.

Similar letters of reference where they occur in the several figures denote like parts of the hive in all of them.

My invention consists in the construction and arrangement of the parts of the hive, by which it may be converted from a single hive of peculiar construction to a double hive, at pleasure, or when the working of the swarm may require, and it further consists in the peculiar device for regulating the ingress or egress opening, said device being capable of four adjustments.

To enable others skilled in the art to make and use my invention, I will proceed to describe the same with reference to the drawings.

A, B, represent the upper and lower sections of the hive, the upper one A, having a base C, of such form and size as to fit or slip into the lower section B, and leave a dead air space $a$ between their walls or sides. When the hive is used as a single one, as shown in Figs. 1, 2, 3, the dead air space $a$, serves to equalize the temperature within the hive, both against the extremes of heat or cold, while ventilation may be effected through said air spaces, and the interior of the hive, by registers $b$, which expose or close the gauze covered openings through the outer walls of the hive. The base C, of the upper section A, is furnished with frames $c$, $c$, which rest upon shoulders or rabbets $d$, $e$, at their top and bottoms, and may be arranged thereon at greater or less distances from each other, as may be desired, the parts $f$ of said frames being inclined, as shown in Fig. 2, to cause the bees to build the comb straight. Through the tops of these frames there are openings $i$, to allow the bees to pass from one comb to another.

$g$, is an inclined board, up which the bees pass to reach the frames. This board is long enough, as shown in Fig. 9, to extend clear across the interior of the hive.

Over the tops of the frames $c$, are placed two boards $h$, $h$, (one of which is shown in full at Fig. 6,) provided with suitable passages $m$, and gauze-covered air openings $k$, and over these boards $h$, are placed the honey or working boxes D, D, (one of which is shown in full at Fig. 7) also furnished with suitable passages $n$. There is also air space $o$ between the walls or sides of the boxes and the outer case or section A. These boxes D, may have glass $p$, in one or more of their sides, and over the tops of the boxes there is a glass plate $q$, and a removable cap or cover E, so that the swarm may be warmed by the sun, when it is desired to do so.

When the hive is to be converted from a single to a double one, the top section A, is raised up out of the lower one B, and the two division or partition boards F, G, are laid over the top of the lower section. The upper section is then turned half around, horizontally, and placed upon these boards F G. The hive then will be as shown in Fig. 4. There are mortises or passages $r$, $r$, and $s$, $s$, made through the boards F, G, so that the working bees only or the whole swarm may be admitted to the upper part of the hive. The parts A and C, of the upper section are hinged together as at $t$, Figs. 1, 2, so that the part B, may be raised up to gain access to the interior of said part, a hook and eye $u$, $v$, being provided at each side to hold them from falling back too far apart and retain them properly.

Over the bee entrances, whether one, two, or more be used, I place a peculiar slide $w$, furnished with slots 1, 2, 3, 4, 5. A thumb screw $x$, passes through the slot 1, and presses against the plate slide $w$, to hold it, when adjusted, to its proper place. Two pins 6, 7, are arranged on the side of the hive, which enter the slots 4, 5, of the plate as shown at Fig. 4, and make one adjustment. When arranged as shown in Fig. 1, it makes a second adjustment, and the opening z may be enlarged or contracted further, even to closing it entirely, which makes a third adjustment, or the upper part of the slide may be brought up against the pins 6, 7, without their entering the slots 2, 3, which makes a fourth adjustment. All these adjustments are advantageous, in the management of bees, to admit the ingress or egres of the whole swarm, or of only the working bees, shutting out the drones, or of shutting in the queen bee, while the others may pass in or out, or for closing the hive against other bees which attack and rob the hive.

Having thus fully described the nature and object of my invention what I claim therein as new and desire to secure by Letters Patent is,

1. The particular construction of the hive so that the smaller portion may fit within the larger portion, and leave a dead air space between them, or, raised up and supported on the division or partition boards, to form two hives, the whole being constructed and operating as herein set forth.

2. And I also claim in combination with the hive constructed as described the device w, for regulating or entirely cutting off the ingress or egress openings, said device being susceptible of four distinct adjustments, as herein above set forth and explained.

KIMBALL P. KIDDER.

Witnesses:
A. B. STOUGHTON,
THOS. H. UPPERMAN.